W. A. WOTHERSPOON.
MECHANICAL DIRECTORY AND ADVERTISING DEVICE.
APPLICATION FILED MAY 29, 1911.
1,042,519.
Patented Oct. 29, 1912.
3 SHEETS—SHEET 2.
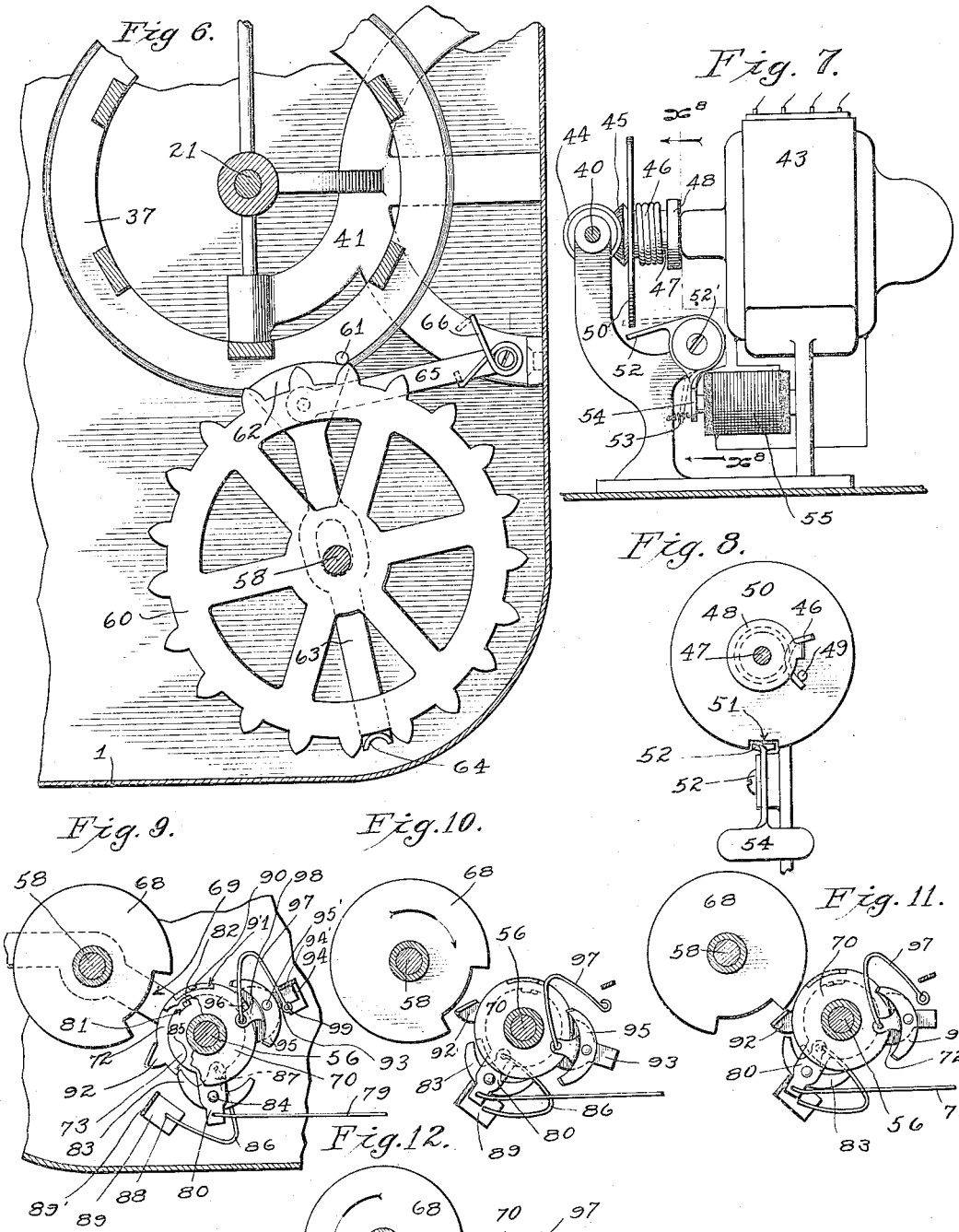
Witnesses:
Inventor:
William A. Wotherspoon

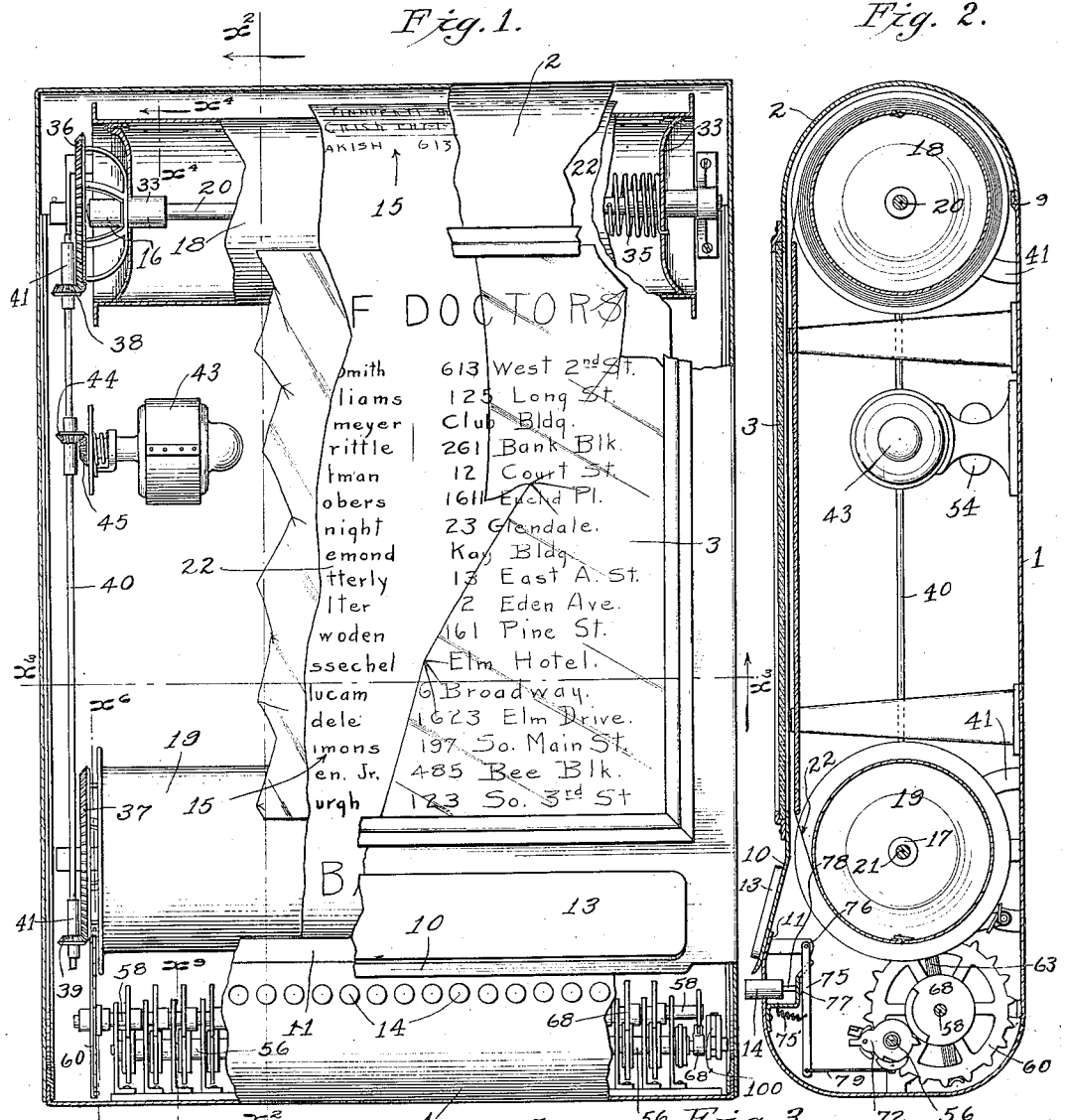

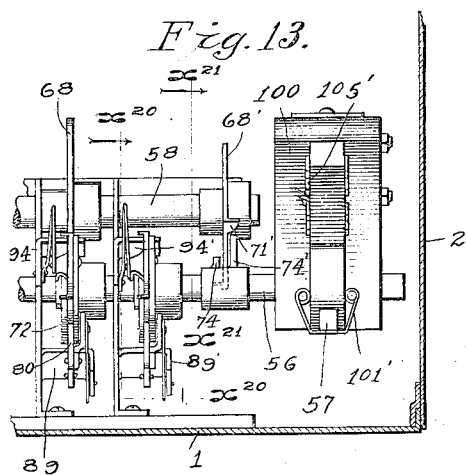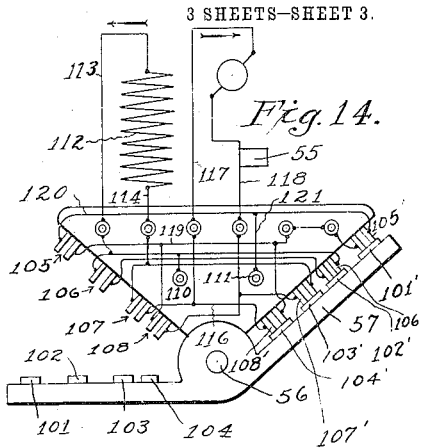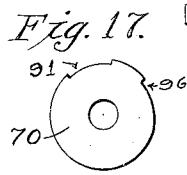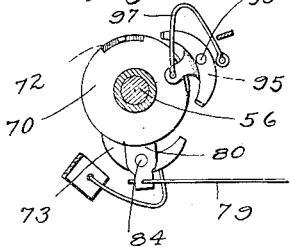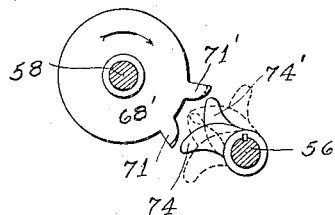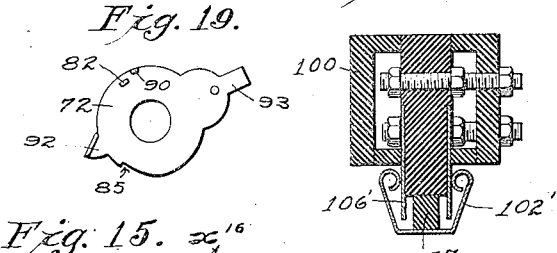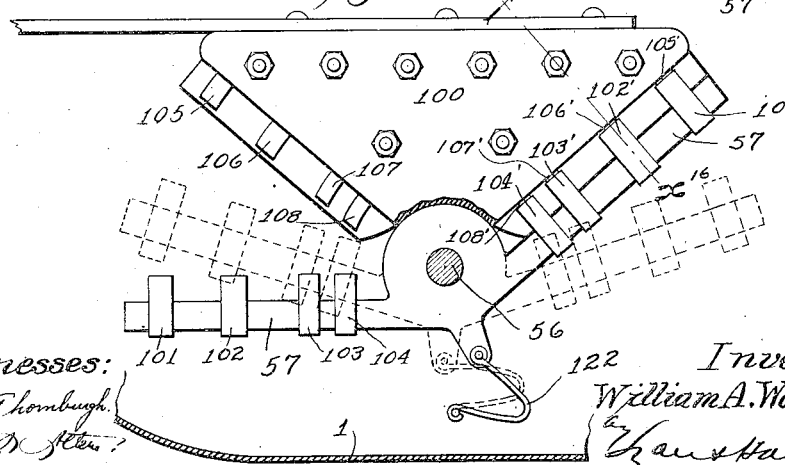

UNITED STATES PATENT OFFICE.

WILLIAM A. WOTHERSPOON, OF LOS ANGELES, CALIFORNIA, ASSIGNOR TO THE AUTOMATIC DIRECTORY COMPANY, A CORPORATION OF ARIZONA.

MECHANICAL DIRECTORY AND ADVERTISING DEVICE.

1,042,519.      Specification of Letters Patent.      Patented Oct. 29, 1912.

Application filed May 29, 1911. Serial No. 630,200.

*To all whom it may concern:*

Be it known that I, WILLIAM A. WOTHERSPOON, a citizen of the United States, residing at Los Angeles, in the county of Los Angeles and State of California, have invented a new and useful Mechanical Directory and Advertising Device, of which the following is a specification.

This invention relates to mechanical directories and advertising devices for exhibiting a large number of names in classified order, and the object of the invention is to provide means whereby any desired part of the list of names may be quickly and readily brought to view.

Another object of the invention is to provide means whereby the directory sheet may be returned to normal position after the same has been inspected.

Other objects of the invention will appear hereinafter.

The accompanying drawings illustrate the invention, and referring thereto: Figure 1 is a front elevation of the device, partly broken away to show the interior parts. Fig. 2 is a vertical section on line $x^2$—$x^2$ in Fig. 1. Fig. 3 is a section on line $x^3$—$x^3$ in Fig. 1, showing the construction of the case. Fig. 4 is a section on line $x^4$—$x^4$ in Fig. 1. Fig. 5 is a section on line $x^5$—$x^5$ in Fig. 4. Fig. 6 is a section on line $x^6$—$x^6$ in Fig. 1. Fig. 7 is a side elevation of the driving motor and its immediate connections. Fig. 8 is a section on line $x^8$—$x^8$ in Fig. 7. Fig. 9 is a section on line $x^9$—$x^9$ in Fig. 1, showing one of the sets of controlling devices for determining the winding operation of the aforesaid sheet or curtain, said controlling device being shown in normal or inoperative position. Fig. 10 is a view similar to Fig. 9, showing the controlling device in position for forward movement of the curtain. Fig. 11 is a view similar to Fig. 9, showing the position of the parts when the curtain is arrested in position for exhibition. Fig. 12 is a view similar to Fig. 9, showing the position of the parts in the reverse movement of the curtain. Fig. 13 is a side elevation of a portion of the controlling devices. Fig. 14 is a diagram of the electric connections for the controlling switch and motor. Fig. 15 is a side elevation of the controlling switch. Fig. 16 is a section on line $x^{16}$—$x^{16}$ in Fig. 15. Figs. 17, 18 and 19 are side elevations of the three members of a set of the controlling devices for the switch. Fig. 20 is a section on line $x^{20}$—$x^{20}$ in Fig. 13. Fig. 21 is a section on line $x^{21}$—$x^{21}$ in Fig. 13.

The device is mounted with a case consisting preferably of two parts, a back member 1 which is adapted to be attached to any suitable support, such as a wall or post, and carries the various parts of the mechanism, and a cover member 2 which is adapted to be slid onto the back member 1 and is provided with a transparent panel or plate 3 in its front. In order to guide the cover member into position, the back member may be provided with a flange 5 at each side fitting in a guideway formed by flanges 6 and 7 on the end plates 8 of the cover member, the downward movement of the cover member being arrested by the lower end of its said flanges 6 and 7, thereon coming in contact with a shoulder 9 on the back member. The lower portion of the front member, indicated at 10, extends obliquely downward and forward to contact with an upwardly bent portion 11 of the back member, when the cover is in position, said back member being bent forward and up at its lower end, as shown, to form this upward extension 11. On this portion 10 of the cover member is provided a series of tablets or indicating means 13, corresponding, for example, to the different classes of names on the list in the directory and below this series of indicating means is provided a series of push buttons or keys 14 sliding in the portion 11 of the case, and adapted to control the operation of the mechanism, as hereinafter set forth.

Within the case at the upper and lower portions thereof are provided two drums 18 and 19 mounted respectively on shafts 20 and 21, said drums carrying the sheet or curtain 22 for containing the list of names, or advertising matter indicated at 15, for the directory or advertising device. Said names are arranged in groups along the curtain so as to be exhibited successively through the glass front plate 3 as the curtain is wound from one roller to the other. Shafts 20 and 21 are mounted in bearings 16 and 17. The ends of the said curtain are secured to the respective drums 18 and 19, for example, by the means shown in Figs. 4 and 5, the peripheral cylindrical wall 23 of each drum having a longitudinal slot 24, through which the end portion of the curtain may be inserted and a plate 25 being mounted within the drum by pins 26 on the drum engaging in slots 27 on said plate 25, said slots extending obliquely with reference to the axis of the drum, so that on drawing the plate longitudinally it will be forced in a direction circumferentially of the drum under the edge 28 of the cylindrical wall of the drum, so as to clamp and bind the curtain 22 between the plate 25 and the edge 28. Such longitudinal motion of the plate 25 may be effected by a screw 30 connected to said plate and engaged by a nut 31 outside of the end wall 33 of the drum, said nut engaging with said end wall to draw the plate 25 longitudinally. The lower drum 19 may be fast on its shaft 21, but the upper drum 18 is preferably rotatably mounted on its shaft 20 and is connected thereto by a yielding or elastic connection consisting of a spring 35 connected at one end to said shaft and at the other end to the end plate 33 of said drum. Gear wheels 36 and 37 are secured to the respective drums 18 and 19 to rotate therewith and engage with pinions 38 and 39 on a vertical shaft 40 mounted in bearings 41 on the back member of the case, driving means being provided for said shaft consisting of a motor 43, a bevel gear 44 carried by said shaft 40 and a bevel gear 45 meshing with said bevel gear 44 and connected to be driven by the motor, an elastic connection 46 being preferably provided between the motor shaft 47 and the bevel gear 45, said elastic connection consisting, for example, of a coil spring surrounding the motor shaft and connected at one end to a collar 48 on the motor shaft and at the other end to a pin 49 on a disk 50 connected to said bevel gear. Disk 50 has a notch 51, and a stop lever 52 pivoted at 52' to a fixed support, is held by a spring 53 in position to engage in said notch to stop the rotations of the disk. Said lever 52 carries an armature 54 for an electromagnet 55, whereby the stop lever is released from notch 51 on energization of said electromagnet.

Means are provided for setting the driving motor in operation under the control of the push buttons 14 aforesaid and for arresting the motion of the motor at a definite point in the movement of the curtain, such definite point of arrest being determined upon the push button being operated. This controlling means consists of a switch connected to a supply circuit, and to the motor to start, reverse and stop the motion, as required, and a mechanical controlling device for controlling the operation of said switch. Said mechanical controlling device comprises a shaft 56 carrying the movable member 57 of said switch, a shaft 58 operated by the shaft 21 of the lower drum and a series of sets of controlling devices mounted on the respective shafts 56 and 58 aforesaid and controlling the operation of the switch shaft 56 in accordance with the operation of the drum and of the respective push buttons 14. Shaft 58 carries a toothed wheel 60 operated by a pin 61 on back of lower gear 37, said pin engaging a tooth of said wheel 60 at each revolution of the drum 19 to turn said wheel a distance corresponding to one tooth. Said pin also engages with a rounded or inclined plate 62 on a slide-bar 63 constituting a detent means and mounted to slide transversely on the shaft 58 of the wheel 60 and having at its other end a projection 64 adapted to engage between two of the teeth on said wheel 60 to normally lock said wheel in fixed position, the construction being such that as the pin 61 approaches position for engagement with a tooth of the wheel 60, it will engage said plate 62 to press the slide bar 63 transversely of the shaft 58 and move the projection 64 on the other end thereof out of engagement with the tooth on said wheel, permitting the wheel to be turned one tooth by the pin. Said slide bar is returned to normal position by a bar 65 pivotally connected thereto and pivoted to a fixed support on the case, a spring 66 engaging with said bar 65 and with said fixed support to move said slide bar to bring the plate 62 thereon into position for engagement with the pin 61 on the gear 37.

The shaft 58 carries a series of disks 68 secured thereto to rotate therewith, said disks having peripheral recesses 69, the length and position of said recesses determining the point at which the movement of the curtain is arrested and being therefore different in each disk, there being one of these disks for each push button and a disk forming a part of the controlling mechanism corresponding to the push button. Each set of controlling devices comprises, in addition to the said disk 68, an operated member consisting of a disk 70 secured to the switch shaft 56 to rotate therewith, this disk being termed the front disk with reference to Figs. 9 to 12, and determining the operation of the switch; an operating member consisting of a rear disk 72 rotatably mounted on the switch shaft 56 and adapted to be operated by the recessed disk 68 aforesaid; and a controlling member consisting of a disk 73 rotatably mounted on the switch shaft 56 intermediate between the front and rear disks 70 and 72 and connected to the push button 14 corresponding to that set, said intermediate or controlling disk being provided with means for controlling or engaging with the rear or operating disk to bring it into coöperative relation with the disk 68 and said disk 68 being provided with means for engagement with the front or operated disk to operate the same at the proper time.

The connection between the intermediate or controlling disk 73 and the push button 14 may consist of a lever 75 pivotally mounted on the portion 11 of the case at 76 and extending down in the rear of a button 77 at the rear end of a stem 78 of push button 14, said lever 75 being connected at its lower end by rod 79 to an arm 80 on the intermediate disk 73, a spring 75′ is connected to lever 75 to return it to usual position. Said intermediate disk 73 is provided with a peripheral recess 81 in which extends a projection 82 from the rear disk 72 and a pawl or anchor 83 is pivoted at 84 to the arm 80 of said intermediate disk and is adapted to engage in a peripheral notch 85 in said rear disk, being normally held in such engagement by a spring 86 connected to an inwardly extending arm 87 on said pawl or anchor and pivotally connected at 88 to a fixed support or bracket 89, said bracket being provided with a lug or portion 89′ serving as a stop for limiting the angular movement of the arm 80.

The rear or operating disk 72 is provided in addition to the projection 82 with a projection 90 extending into a recess 91 in the operated or front disk 70 and said rear disk is further provided with a peripheral projection or lug 92 adapted to extend into the recess 69 of the disk 68 and to be engaged by the end wall of said recess in the rotation of said disk 68. Said rear disk is also provided with an arm 93 adapted to engage a fixed lug or stop 94′ to limit the rotative movement of said disk, said arm carrying a pawl or anchor 95 pivoted thereto at 95′, and adapted to engage with a peripheral notch 96 in the front disk 70. A spring 97 connected to an inwardly extending arm 98 of said pawl or anchor and pivotally connected at 99 to a fixed support 94, serves to hold the pawl or anchor into or out of operative engagement with the front disk, the line of pressure of the spring moving past the dead center with relation to the pivot 95′ of the pawl or anchor member 95 in the rotative movement of the rear disk.

In the case of the last controlling device of the series, the lug 92 is omitted from the operating disk indicated at 72′ in Fig. 20 the last button being intended to cause the drums to revolve to wind the curtain completely from one drum to the other. In this operation the arrest of the parts is determined by a supplementary disk 68′ provided with teeth 71 and 71′ extending on opposite sides thereof and adapted to engage respectively with arms 74 and 74′ on shaft 56.

The switch for controlling the motor circuit may be of any usual or suitable construction, consisting, for example, of a two-armed lever 57 of insulating material carried by the shaft 56 and provided with contacts 101, 102, 103 and 104 at one side of the pivot and contacts 101′, 102′, 103′, and 104′ at the other side of the switch, these contacts being adapted to coöperate respectively with pairs of fixed contacts 105, 106, 107, 108, and 105′, 106′, 107′, and 108′ on an insulating support or base 100. The circuit connections may be as illustrated in Fig. 14, the supply connection from any suitable source of supply being brought to terminals 110 and 111. The motor is shown as a series wound motor, the field coil 112 being connected to the supply line terminal 110 through a wire 113, the other end of the field coil being connected by a wire 114 to one of the pairs of contacts 107, the other contact of said pair being connected by wire 116 and wire 117 to one side of the armature, the other side of the armature being connected by a wire 118 to one of the pair of contacts 108, the other contact of said pair being connected by wire 119 to one of the pair of contacts 105, the other contact 105 being connected by wire 120 and wire 121 to the other terminal 111. The connections for the contacts 105′, etc., on the other side of said switch are identical, except that the armature connections are reversed in the well known manner, so as to reverse the direction of rotation of the motor when the switch has made its contact on said other side. The electromagnet 55 controlling the stop mechanism may be included in series with the motor, as indicated in Fig. 14. A spring 122 is provided for throwing the switch quickly over the center and holding it in either position.

The operation is as follows: In normal position, the curtain 22 is wound wholly on the lower drum 19, switch member 57 is in position shown in dotted lines in Fig. 15 opening motor circuit, electromagnet 55 is deënergized, releasing its armature 54 and allowing stop lever 52 to engage in notch 51 in disk 50, locking the curtain in normal position. Detent means 63 is in position shown in Fig. 6 in which its projection 64 engages between two of the teeth in the wheel 60 locking said wheel in normal position and in this position of the wheel 60 and of the shaft 58 carrying the same, the disks 68 on said shaft 58 are in position with their recesses 69 opposite and adjacent to the controlling devices on the shaft 56, so that the lugs 92 on the disks 72 for such controlling devices may enter said recesses when operated, as hereinafter set forth.

The said disk 72 of each controlling device is normally in position with its lug 92 somewhat in advance of the position for entering said recess. Pawl or anchor 83 is in engagement with the notch 85 in said disk 72 under the action of the spring 86. Pawl or anchor 95 is out of engagement with the notch 96 in the front disk 70 being held out by the action of the spring 97 and extending over a peripheral portion of said disk in the rear of said notch. Projection 82 on the rear disk 72 is in engagement with the forward end of the notch in the recess 81 in the intermediate disk and the projection 90 on said rear disk is about midway of the length of the recess 91 in the front disk, said recess 91 being of considerable circumferential length so as to provide for a certain amount of lost motion in each direction as hereinafter set forth. Arm 93 on the rear member is in contact with the stop 94', the parts having been thrown back to the position after the release of the last operated push button first by the action of the spring 75 and finally by the action of the springs 86, 97 and 122.

A person who wishes to consult the directory first inspects the series of indicating tablets 13 and having found the one representing the class of information or the list of names he desires he presses the corresponding push button 14, thereby pressing back lever 75 against tension of the spring 75' and the rod 79 connected thereto and turning the intermediate member 73 around the shaft 56. In this turning movement of the arm 80, the pawl 83 by engagement in the notch 85 pushes the rear disk around with the intermediate disk 73. The front disk 70 remains stationary, being held so by the action of the spring of the switch and in this movement of the rear disk the projection 90 thereon rides forward to the forward end of the recess 91 in the front disk and then in its further forward movement engages with the forward end of said recess to turn the front disk forward sufficient to move the switch from position shown in dotted lines to position shown in full lines in Fig. 15. In this final part of the movement of the intermediate disk 73, the pawl 83 thereon moves past the position in which the pivotal centers of the spring 86 are in line with the pivotal axis of the pawl 83, so that the tension of said spring throws the pawl out of engagement with the notch 85 in the rear disk 72, as shown in Fig. 10, the rotative movement of the rear disk, as above set forth, under the action of the intermediate disk and the connecting pawl 83, causes the other pawl 95 to pass forwardly over the periphery of the front disk and into position over the notch 96 in said front disk and in the latter part of this movement the pivot of said pawl passes the dead center position with respect to the spring 97, so that said spring forces said pawl into engagement with said notch 96, as shown in Fig. 10. The angular movement of the rear disk 72, effected as above described, brings the lug 92 on said disk into position within the recess 69 in the disk 68 on the shaft 58. This position, shown in Fig. 10, is the position for forward movement, the switch having been closed by movement of the front disk 70, as above set forth, and the switch closing the circuit to the motor through the connections above described and also energizing the electromagnet 55, the armature of said magnet being thereby operated to withdraw the stop lever 52 from the recess in disk 50 and the motor then operating through the gears 45, 44, shaft 40, pinions 38 and 39 and gear wheels 36 and 37 to rotate both of the drums 18 and 19 in the same direction and wind the curtain 22 off of the lower drum and onto the upper drum.

It will be understood that as the curtain is wound onto the upper drum, the effective radius of the upper drum is increased by an amount representing the thickness of the winding on the drum, so that if both drums were rigidly connected with their shafts an undue amount of stretch or strain would be exerted on the curtain in winding on the upper drum. This difficulty is obviated by the provision of the spring connection 35 which allows the upper drum to yield sufficiently to compensate for the increase in effective radius due to the winding of the curtain thereon and to always maintain the curtain under proper tension.

The person who is consulting the directory maintains pressure on the push button, thereby holding the controlling devices in position shown in Fig. 10 and at each rotation of the lower drum, the pin 61 on gear 37 engages with the rounded plate 62 on the detent means 63 to release said detent means from the wheel 60, and then, passing between two of the teeth of said wheel, turns said wheel the distance of one tooth, the detent means snapping back to position to lock the wheel as soon as the pin has passed off of the rounded plate 62. The shaft 58 and the disk 68 thereon are thereby advanced step by step and at a predetermined time in the operation of the apparatus which is determined by the length of the recess 69 in the disk 68, the rear end of said recess comes into engagement with the lug 92 on the rear disk 72 and turns said lug and rear disk rearwardly, that is to say, in the opposite direction to that to which they were moved by the action of the controlling member 73. In this back movement of the rear disk 72, the lug 82 thereon moves back to the rear end of the recess 81 in the intermediate disk 73 and in this movement of disk 72, anchor 95 then engages with notch 96 for front disk 70 to return the front disk to position shown in Fig. 11, which is the normal position, the switch 57 being open in this position of the front disk. This opening of the switch 57 deënergizes the motor and also deënergizes the electromagnet 55, allowing the stop lever 52 to engage in the recess in the disk 50 and arresting the drums and the curtain in a definite position, this position being such as to expose one of the sets or lists of names on the directory on the curtain, so that the same can be inspected through the front glass plate 3. It will be noted that the extent to which the curtain has been rolled or wound up depends on the amount of revolution of the drums that takes place before the disk 68 engages with the lug 92 to push the same back to position shown in Fig. 11 and is therefore dependent on the length and position of the recess 69 in said disk.

The party having inspected the list, releases the button 14 and the lever 75 moves back to normal position, carrying the arm 80 to position shown in Fig. 12. In this movement the pivot for the pawl 83 again passes the dead center and the spring 86 throws said pawl back into engagement with the periphery of the rear disk 72. In this back movement of the intermediate disk 73 under the action of the lever 75, the rear end of the recess 81 in said disk engages with projection 82 on the rear member 72, thereby turning said rear member an additional amount in a rearward direction and the pawl 95 being at this time in engagement with a notch 96 in the front disk, said front disk is also turned an additional amount in a rearward direction to position shown in Fig. 12, thereby turning the switch 57 to position for reverse, the motor being thereby energized in position to wind the curtain in the opposite direction and the electromagnet 55 being then energized to again release the stop lever 52 to permit the curtain to be so operated. It will be noted that in this reverse movement of the curtain, the pin 61 on the lower gear engages with the rounded plate 62 on the detent means 63 and with the teeth of the toothed wheel 60 in the same manner as in the forward movement, but in a reverse direction. As the controlling member 73 completes its rearward movement under the action of the lever 75, the pawl 95 again passes to position to carry the pivot thereof past the dead center with respect to the spring 97, so that the spring throws said pawl out of engagement with the periphery of the front disk 70. The motor will continue to operate the drums in reverse direction to unwind the curtain from the upper drum onto the lower drum, and when this unwinding operation has been fully performed, the extra disk 68 on the shaft 58 engages by its tooth 71' with an arm 74' on the switch shaft 56 to return the switch to normal position shown in dotted lines in Fig. 15. To prevent the switch from being thrown over at this time by the momentum, the spring 122 for said switch is preferably given a set or bias toward the reversing side, as shown. When the motor circuit is interrupted by restoration of the switch 57 to normal position, the electromagnet 55 is also deënergized and the stop lever 52 engages the disk 50 to arrest the parts in normal position, the elastic connection 46 allowing this arrest to be made suddenly and at definite position and permitting the motor to continue to rotate until its momentum has been exhausted.

In case the last button of the series is pushed the switch shaft is operated by the connection through the last controlling device shown in Fig. 20, the construction of which is identical with that of the others, except that the lug 92 and the disk 68 are omitted. In the operation the arms 74 and 74' are moved from full line position in Fig. 21 to dotted line position which they retain until the revolution of shaft 58 brings tooth 71 into engagement with arm 74, restoring the switch to normal position, the curtain being then completely unwound. Then when the button is released the operation of the last controlling device throws the switch shaft to reversing position as above described, bringing the arms 74 and 74'. to position shown in broken lines in Fig. 21, and as the curtain completes its return movement the tooth 71' on the extra disk engages arm 74' to return the switch shaft to normal position.

What I claim is:

1. A mechanical directory, comprising a case, two drums journaled therein, a curtain winding on said drums, said case being provided with means for exposing a part of said curtain, a motive device adapted and arranged to operate said drums to wind said curtain in either direction, a series of manually controlled devices, each constructed and arranged to set the motive device in operation to wind the curtain in one direction on operation of any one of said controlling devices, and to arrest the movement of the curtain after a determinate amount of rotation of the drums, such determinate amount of rotation differing for the different controlling devices, means for restoring the manually controlled devices to normal position, and means responsive to such restoring movement of the manually controlled devices to cause the said motive device to wind the curtain in reverse direction and restore the curtain to normal position.

2. In a mechanical directory, a case, two drums journaled therein, a curtain winding on said drums and provided with directory information, said case being provided with means for exposing a portion of said curtain, a motor connected to rotate said drums, a series of manually controlled devices each constructed and arranged to set the motor in operation and to arrest the movement of the motor after a determinate amount of rotation of the drums, such determinate amount of rotation differing for the different controlling devices, means for restoring the manually controlled devices to normal position, and means responsive to such restoring movement of the manually controlled devices to set the motor in operation, to wind the curtain in a reverse direction and to restore the curtain to normal position.

3. In a mechanical directory, a case, two drums journaled therein, a curtain winding on said drums and provided with directory information, said case being provided with means for exposing a portion of said curtain, an electric motor connected to rotate said drums, energizing connections for said electric motor, a switch in said energizing connections for connecting the motor in circuit to rotate so as to wind the curtain in forward or reverse directions, a series of push buttons, and controlling means for said switch comprising devices operated by each of the push buttons to move the switch to position for winding the drum forward, said controlling means also comprising devices operated by one of the drums to move the switch to open position after the curtain has been wound to a definite extent, and said controlling means also comprising devices operated by the movement of the operated push button to normal position to move the switch to position for winding the curtain in the reverse direction.

4. In a mechanical directory, the combination with the directory curtain, means for supporting and winding said curtain, an electric motor connected to drive said curtain supporting and winding means, a switch and energizing connections for the motor for operating the motor in forward and reverse directions, a switch shaft connected to operate said switch, a shaft operated by the curtain supporting and winding means, a series of disks on said last named shaft provided with recesses of different length, a member operated by each of said recessed disks and rotatably mounted on the switch shaft, said member being provided with a projection adapted to engage in the recess of the corresponding disk and said member being provided with a pawl, a series of push buttons, a member connected to be operated by each of said push buttons and rotatably mounted on the switch shaft and provided with pawl means for engaging the aforesaid member on said switch shaft, and a member secured to the switch shaft for engaging with the pawl means on each of the aforesaid members operated by the recessed disks.

5. In a mechanical directory, a controlling device comprising, in combination with curtain winding means and a motor for driving the same, a switch for controlling the movement of said motor in forward and reverse directions, a plurality of sets of controlling means, each set comprising a manually operated push button, means for restoring the push buttons to normal position, a member connected to the push button to be operated thereby to a definite angle, an operated member provided with a projection, pawl means for causing forward movement of said operated member under the operative movement of the first named member under the action of the push button, means for releasing said pawl means at the end of the operative stroke of the push button, each set of controlling means also comprising a member connected to be operated correspondently with the movement of the curtain and provided with means for engaging the aforesaid projection on the operated member in the same set to restore said operated member to normal position, and a switch actuating member connected to operate the switch and provided with means engaging with the aforesaid operated member to move the switch to position for forward movement of the motor on movement of the push button and to move the switch to position for opening the motor circuit on return movement of the said operated member.

6. In a mechanical directory, a controlling device comprising, in combination with curtain winding means and a motor for driving the same, a switch for controlling the movement of said motor in forward and reverse directions, a plurality of sets of controlling means, each set comprising a manually operated push button, means for restoring the push buttons to normal position, a member connected to the push button to be operated thereby to a definite angle, an operated member provided with a projection, pawl means for causing forward movement of said operated member under the operative movement of the first named member under the action of the push button, means for releasing said pawl means at the end of the operative stroke of the push button, each set of controlling means also comprising a member connected to be operated correspondently with the movement of the curtain and provided with means for engaging the aforesaid projection on the operated member in the same set to restore said operated member to normal position, and a switch actuating member connected to operate the switch and provided with means engaging with the aforesaid operated member to move the switch to position for forward movement of the motor on movement of the push button and to move the switch to position for opening the motor circuit on return movement of the said operated member, said operated member being provided with pawl means for engaging the said switch actuating member to move the said switch actuating member rearwardly to reverse the switch in the return movement of the push button.

In testimony whereof, I have hereunto set my hand at Los Angeles, California this 19th day of May, 1911

WILLIAM A. WOTHERSPOON.

In presence of—
ARTHUR P. KNIGHT,
GLADYS RUSSELL.